Oct. 31, 1939.　　　　R. WEISS　　　　2,177,968
BUMPER GUARD
Filed March 31, 1939
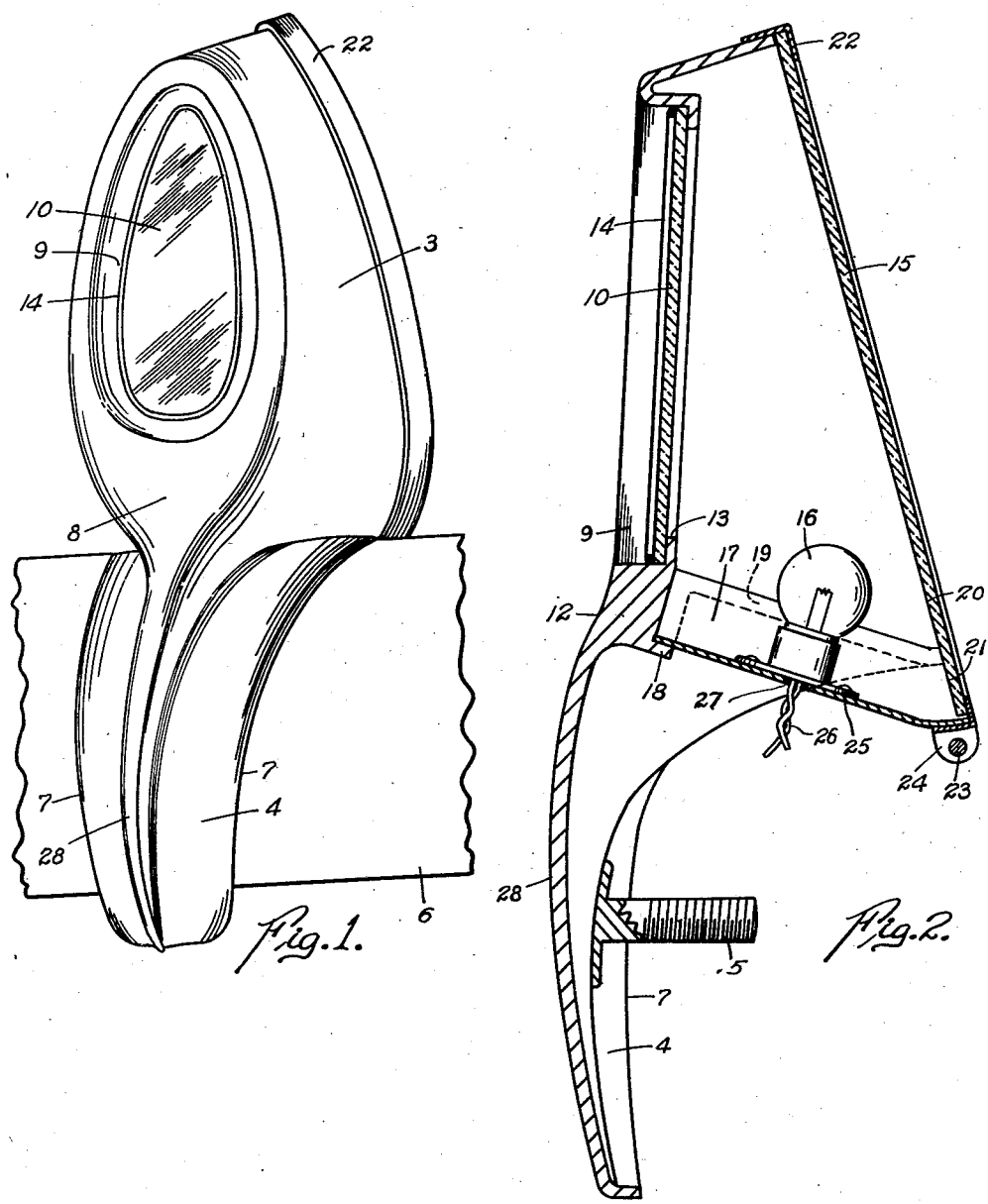
INVENTOR
Raymond Weiss
BY Frank Zigelter
ATTORNEY Patented Oct. 31, 1939

2,177,968

UNITED STATES PATENT OFFICE 2,177,968

BUMPER GUARD

Raymond Weiss, Cincinnati, Ohio

Application March 31, 1939, Serial No. 265,274

6 Claims. (Cl. 240—7.1)

The present invention relates to a bumper guard for vehicles, and especially to certain improvements therein for enhancing both the utility and the appearance of such devices.

An object of the invention is to provide a bumper guard incorporating means for night illumination of the vehicle front for marking the center or the limits of the vehicle, for the benefit of oncoming vehicle drivers in safely passing a vehicle equipped with the device of the invention.

Another object of the invention is to provide a bumper guard for vehicles, which is constructed in such a manner as to pleasingly ornament a vehicle to which it is applied, and to impart a distinctive characteristic thereto for advertising purposes.

A further object of the invention is to provide a simple and inexpensive construction for devices of the character stated, while at the same time presenting the advantages and features mentioned.

Another object is to furnish the improvements above recited, without resorting to basic changes in bumper guards as presently designed for automobile usage.

These and other objects are attained by the means described herein and disclosed in the accompanying drawing, in which:

Fig. 1 is a front perspective view of the improved bumper guard, applied to an automobile bumper.

Fig. 2 is a vertical longitudinal cross-sectional view of the bumper guard disclosed in Fig. 1.

Prior to the present invention, it has been common practice to equip automobiles with so-called automobile guards, which when applied to the forward bumper of the vehicle, afford protection for the front end of the vehicle against damage resulting from the impact of one vehicle against another when operated in close quarters. Bumper guards have been applied also to the rear bumper, for protecting the fenders, the luggage compartment, and other areas of the rear of the vehicle. The bumper guard generally extends above, and sometimes below the elevation of a bumper to which it is applied. Bumper guards generally are considered a desirable, if not a necessary accessory to the automobile.

The bumper guard of the invention comprises an upper elongated hollow housing 3 and an apron or lower clamping section 4 depending therefrom, said apron including any suitable means such as a threaded stud 5 for mounting the bumper guard upon a bumper 6. In the present embodiment, the stud 5 is adapted to enter an opening in the bumper 6, but it should be understood that any other form of mounting means may be employed in order that the guard may be accommodated to various types of bumpers. The apron preferably is formed of a substantially concavo-convex configuration in the interest of strength and durability, and as the result of such construction there is furnished a pair of clamping edges 7 adapted to engage the forward surface of the bumper when the guard is clamped thereon by means of the fastening device 5.

The upper elongated hollow housing 3 has a forward face 8 with an opening 9 formed therein to receive a colored marking lens 10 of translucent material, and such lens is adapted to extend upwardly from the junction point 12 of the hollow housing and the depending apron, as illustrated. The lens or translucent sheet 10 preferably is recessed relative to the forward face of the housing part, to protect it from injury that might result from all ordinary impact forces. While any suitable means may be employed for holding the lens or sheet 10 in position within the recess 9, one satisfactory form of means comprises a peripheral flange or support means 13 set deeply within the recess and adapted to abut the inner face of the lens or sheet 10. The lens or sheet may be maintained in position against the flange by the use of any suitable means, for example a resilient ring or wire retaining element 14. The forward lens may extend substantially vertical, or may be inclined slightly as shown.

A second translucent sheet 15 is adapted to close the rear of the hollow housing 3, and to pass light rays rearwardly through the open rear end of the housing for the purpose of illuminating that portion of the vehicle which faces the sheet 15. Illumination for both of the translucent sheets or lenses may be furnished by a lamp 16 and a reflector 17, the latter being utilized as a closure for the lower open end of the housing 3. The reflector 17 may be supported by means of flanges 18 and 19 formed along the inside of the bumper guard, it being understood that a flange such as 19 is located at each side of the housing. The reflector preferably spans the housing, and extends from the region of the forward lens to the rear edge 20 of the housing. It should be noted that the rear edge 20, together with the rear edge 21 of the reflector, forms a peripheral abutment that may be utilized for supporting the element 15, although it will clearly be evident that the rear lens element 15 might be supported upon the housing in substantially the manner explained in connection with the forward lens 10.

The rear circumferential edge 20—21 for supporting the lens or sheet 15, by preference lies in a plane which is inclined upwardly and forwardly toward the plane of the lens or sheet 10, so that there is imparted to the hollow housing an area of maximum depth located at the upper portion of the apron. The rear edge mentioned is disposed well to the rear of any part of the depending apron. A retaining band 22 or its equivalent, may be slid over the housing and in abutment upon the lens 15, to fix the lens in the desired relationship to the open rear of the housing. Retaining bands of the character mentioned will generally include a screw or other securing means 23 extending through perforated lugs or ears 24 of the band, for clamping the band tightly about the housing periphery at 20 and 21.

The lamp 16 may be supported within the completely closed housing, by mounting its base socket 25 directly upon the reflector 17. The wires 26 for the lamp may extend through an opening 27 in the reflector, and be electrically connected with the battery or other source of electricity in a manner well known. The circuit of the lamp preferably is controllable by means of a switch located within the reach of the driver of the vehicle.

It should be observed that the reflector 17 extends from the forward opening to the rearward opening of the housing, and is preferably inclined rearwardly and downwardly so as to form an included acute angle with the plane of the rear edge 20 of the housing, thereby to direct reflected light rays through the rear lens, in an upward and rearward direction for the purpose of illuminating the radiator grille and other forward portions of the vehicle. The forward lens 10, being used mainly as a marker for indicating the center of the vehicle when the bumper guard is applied at the center of the front bumper, does not require the intensity of illumination that the rear lens 15 should have in order to effectively illuminate the front of the vehicle. It is accordingly considered unnecessary to furnish means of reflecting light from the lamp 16 through the forward lens 10; however, the intensity of light directed forwardly through lens 10 may be increased by polishing or otherwise treating the interior walls of the housing 3 with a light reflecting medium.

The description up to this point has assumed application of the bumper guard to the front bumper of a vehicle. When the bumper guard is applied to the rear bumper of the vehicle, it may be furnished in pairs and may accordingly be used as a substitute for the tail light, stop light and license plate illuminator commonly applied to all vehicles. In addition to providing an effective substitute for tail lights, stop lights, and license plate illuminators, the bumper guard of the invention fully illuminates the rear of the vehicle and renders it clearly visible during the night season. Moreover, the improved bumper guard renders it unnecessary to equip the vehicle with separate illuminators for the interior of the trunk or baggage compartment of the vehicle. It will accordingly be appreciated that the device of the present invention is highly useful, without any alterations whatever, at either the front or the rear of the vehicle. Its application to the rear of the vehicle effects a substantial saving to the manufacturer in that the manufacturer may supply this device as a substitute for separate bumper guards, tail lights, stop lights, license plate illuminators, and luggage compartment lights. It will at once be evident that the use of the improved bumper guard will greatly simplify the wiring system of the vehicle, and will further reduce the cost of the vehicle.

The elements 10 and 15 may be translucent sheets or lenses manufactured from glass or any substitute therefor having the light permeability characteristic of glass. For the purpose of strength and durability of the apron, a central reinforcing rib 28 may be pressed or otherwise formed into the material of the apron extending preferably from the lower end of the apron to the lower end of the hollow lamp housing.

As will readily be understood, changes in the design of the bumper guard or in the bumper itself, may necessitate slight variations in the structural details of the guard, and such variations are contemplated within the scope of the invention except where specifically limited by the language of the appended claims. In certain instances it may be considered desirable to alter the lens mountings or the retainers therefor, or to change the type of bumper clamp employed in order to accommodate the various types of bumpers. Various other modifications and changes may be made without departing from the spirit of the invention.

It should be observed that a guard made in accordance with the present disclosure is interchangeably applicable to either a front or a rear vehicle bumper, without loss of any of its intended functions, and without requiring changes in the construction or design. The manufacturing and sales advantages of this feature are readily evident.

What is claimed is:

1. A front or rear guard for attachment to automobile bumpers, comprising an upper elongated hollow lamp housing having a front opening and a rear opening formed therein, a depending apron on the housing including means for mounting the guard vertically upon a bumper, with the lamp housing disposed above the level of the bumper, and a lamp within the housing intermediate said openings for directing light rays both forwardly through the front opening and rearwardly through the rear opening, as and for the purposes described.

2. A front or rear guard for attachment to automobile bumpers, comprising an upper elongated hollow housing and an integral apron depending therefrom, said housing and apron both being convex for rigidly opposing impact forces directed thereto, the apron including abutment areas formed to fit the outer face of an automobile bumper, clamping means on the apron for mounting the guard upon the bumper with the hollow elongated housing disposed above the bumper lever, a window formed at the rear of the hollow housing, and illuminating means in the housing for directing light rays through said window and upon the vehicle carrying the bumper to which the guard is clamped.

3. A front or rear guard for attachment to automobile bumpers, comprising an upper elongated hollow housing and an integral apron depending therefrom, said housing and apron both being convex for rigidly opposing impact forces directed thereto, the apron including abutment areas formed to fit the outer face of an automobile bumper, clamping means on the apron for mounting the guard upon the bumper with the hollow elongated housing disposed above the bumper lever, a front window recessed in the hollow housing providing a protective border thereabout, a rear window in the housing inclined forwardly and rearwardly, each window including a light-permeable sheet, and illuminating means in the housing to direct light rays through said windows for the purposes described.

4. A guard for attachment to automobile bumpers, comprising a substantially vertical apron for abutting the bumper, means on the apron for mounting it upon the bumper, an elongated hollow housing integral with the apron and extending above and rearwardly beyond the apron, said housing having a front window and a rear window, said rear window being inclined upwardly and forwardly to form a compartment of gradually increasing size reaching a maximum at approximately the junction of the apron and the hollow housing, an inclined reflector plate spanning the housing and extending substantially from the front window to the rear window, the inclination of said reflector plate being such as to form an included acute angle with the plane of the rear window whereby to direct light rays upwardly toward and through said rear window, and illuminating means within the housing and above the reflector plate, at substantially the region of maximum size of the housing interior.

5. An impact guard for attachment to automobile bumpers, comprising a clamp portion and an upstanding elongated hollow housing, said housing including deep side walls extended rearwardly beyond and above the clamp portion, a top wall, and a reflector plate, said side and top walls co-operating with the reflector plate to provide a rear circumferential edge, a light-permeable sheet adjacent to said circumferential edge and providing a rear closure for the hollow housing, said sheet substantially meeting the reflector plate at an acute angle, and illuminating means carried by said reflector plate and extending above it within the hollow housing for casting direct and reflected light rays through the light-permeable sheet.

6. A guard for attachment to automobile bumpers, comprising an open hollow housing, having side walls, a top, and a reflector plate forming the bottom of the housing, an integral apron depending from the housing, said housing and apron both being convex for rigidly opposing impact forces directed thereto, the apron including abutment means conforming substantially to the contour of the bumper, clamping means for securing the abutment means upon the bumper, an illuminator within the confines of the hollow housing of the bumper guard, front and rear openings in the housing, and light permeable sheets for covering said openings to protect the illuminator and reflector from dirt, water and other foreign substances.

RAYMOND WEISS.